US006929200B2

(12) United States Patent
Bouchard et al.

(10) Patent No.: US 6,929,200 B2
(45) Date of Patent: Aug. 16, 2005

(54) METHOD FOR PREVENTING ASBESTOS FROM FREEING AIRBORNE PARTICLES

(76) Inventors: Luc Bouchard, 24A, Fraser Street, C.P. 46060, Lévis (Québec) (CA) G6V 8S3; Lisette Voisine, 24A, Fraser Street, C.P. 46060, Lévis (Québec) (CA) G6V 8S3

( * ) Notice: Subject to any disclaimer, the term of this patent is extended or adjusted under 35 U.S.C. 154(b) by 0 days.

(21) Appl. No.: 10/956,149

(22) Filed: Oct. 4, 2004

(65) Prior Publication Data

US 2005/0077402 A1    Apr. 14, 2005

Related U.S. Application Data

(63) Continuation of application No. PCT/CA03/00555, filed on Apr. 15, 2003.
(60) Provisional application No. 60/376,925, filed on Apr. 22, 2002.

(51) Int. Cl.[7] .......................... B02C 11/08; B02C 21/00
(52) U.S. Cl. ................... 241/23; 423/167.1; 588/411; 588/254
(58) Field of Search ................. 241/23; 423/167.1; 588/411, 254

(56) References Cited

U.S. PATENT DOCUMENTS

| | | | | |
|---|---|---|---|---|
| 3,914,184 A | * | 10/1975 | Harada et al. | 588/318 |
| 4,820,328 A | * | 4/1989 | Roberts et al. | 65/134.3 |
| 5,085,838 A | * | 2/1992 | Mason | 423/167.1 |
| 5,264,655 A | * | 11/1993 | Mirick et al. | 588/318 |
| 5,614,452 A | * | 3/1997 | Clausen et al. | 501/155 |

FOREIGN PATENT DOCUMENTS

| | | |
|---|---|---|
| DE | 44 33 837 A1 | 3/1996 |
| EP | 0 344 563 | 12/1989 |

* cited by examiner

Primary Examiner—Mark Rosenbaum
Assistant Examiner—Jason Y Pahng
(74) Attorney, Agent, or Firm—F. Martineau

(57) ABSTRACT

The method for preventing asbestos from freeing airborne particles comprises sequentially heating and the asbestos in the following surrounding temperatures values and maintaining the asbestos in these surrounding temperature values until the asbestos changes to the following corresponding colors:

a) between 125° F. (52° C.) and 175° F. (79° C.) until the asbestos changes to a uniform pale russet-red color;
b) between 225° F. (107° C.) and 275° F. (135° C.) until the asbestos changes to a uniform dark russet-red color;
c) between 325° F. (163° C.) and 375° F. (191° C.) until the asbestos changes to a uniform dark orange color;
d) between 425° F. (218° C.) and 475° F. (246° C.) until the asbestos changes to a uniform red color;
e) between 525° F. (274° C.) and 575° F. (302° C.) until the asbestos changes to a uniform grey color; and
f) between 625° F. (329° C.) and 675° F. (357° C.) until the asbestos changes to a uniform opaque white color.

Once all the asbestos has reached an opaque white color, the surrounding temperature is decreased to an ambient temperature.

8 Claims, 2 Drawing Sheets

METHOD FOR PREVENTING ASBESTOS FROM FREEING AIRBORNE PARTICLES

CROSS-REFERENCE DATA

This application is a continuation of international application No. PCT/CA03/00555 filed on Apr. 15, 2003 which claims the priority of U.S. provisional patent application No. 60/376,925 filed on Apr. 22, 2002.

FIELD OF THE INVENTION

The present invention relates to an asbestos heat treatment process, and more particularly to a method for preventing asbestos from freeing airborne particles.

BACKGROUND OF THE INVENTION

Asbestos is the generic name given to a specific group of six naturally occurring fibrous silicate minerals which are part of two sub-groups: the serpentine sub-group comprises a single type of asbestos called the chrysotile; and the amphibole sub-group comprises the following types of asbestos: crocidilite, amosite, anthophyllite, tremolite and actinolite. The two sub-groups of asbestos differ in their crystalline structure: the serpentines have a sheet or layered structure, while the amphiboles have a chain-like structure. The chrysotile is the asbestos which is by far the most commonly extracted asbestos type world-wide.

Asbestos can be used advantageously in an important number of industrial applications, such as roofing, thermal and electrical insulation, in cement pipes and sheets, in flooring, gaskets, friction materials, coatings, plastics, textiles, paper, and a number of other products. Its particular composition, coupled with the fact that it is the only naturally occurring fibrous mineral, make it an extremely useful and versatile component.

However, asbestos suffers an important drawback: it can cause diseases if asbestos particles are inhaled in minimum threshold quantities. Since asbestos is a frangible material that frees airborne particles, asbestos particles may be inhaled in significant quantities under specific circumstances.

Some diseases imputed to inhaled asbestos include the following: asbestosis, which is a scarring of the lung tissue which leads to breathing difficulties; lung carcinomas, which are malignant lung tumors of the bronchi covering; and mesotheliomas, which is a cancer of the pleural lining. It is noted that even if significant proportions of asbestos particles have been found in drinkable water, there appears to be no incidence of cancers or other diseases related to ingested asbestos particles.

It is consequently understood that gathering asbestos can be hazardous, and even lethal over a long period of time, for the workers who are exposed to the airborne asbestos fibers. Also, if an object made from a material containing asbestos is damaged during its use, it may free asbestos particles into the air, which may lead to inhalation thereof by the persons located close to this object. For example, workers destroying a house or building structure including asbestos in its walls and/or roofing, can be exposed to significant airborne asbestos particles concentrations and may contract an asbestos-related disease.

SUMMARY OF THE INVENTION

The present invention relates to a method for preventing soaked asbestos from freeing airborne particles, comprising the following sequential steps affecting the temperature surrounding the asbestos:

a) heating the asbestos in a first surrounding temperature value located between 125° F. (52° C.) and 175° F. (79° C.) and maintaining the asbestos in this first surrounding temperature value until the asbestos changes to a uniform pale russet-red color;

b) increasing the surrounding temperature from said first temperature value to a second temperature value located between 225° F. (107° C.) and 275° F. (135° C.) and maintaining the asbestos in this second surrounding temperature value until the asbestos changes to a uniform dark russet-red color;

c) increasing the surrounding temperature from said second temperature value to a third temperature value located between 325° F. (163° C.) and 375° F. (191° C.) and maintaining the asbestos in this third surrounding temperature value until the asbestos changes to a uniform dark orange color;

d) increasing the surrounding temperature from said third temperature value to a fourth temperature value located between 425° F. (218° C.) and 475° F. (246° C.) and maintaining the asbestos in this fourth surrounding temperature value until the asbestos changes to a uniform red color;

e) increasing the surrounding temperature from said fourth temperature value to a fifth temperature value located between 525° F. (274° C.) and 575° F. (302° C.) and maintaining the asbestos in this fifth surrounding temperature value until the asbestos changes to a uniform grey color;

f) increasing the surrounding temperature from said fifth temperature value to a sixth temperature value located between 625° F. (329° C.) and 675° F. (357° C.) and maintaining the asbestos in this sixth surrounding temperature value until the asbestos changes to a uniform opaque white color; and g) decreasing the surrounding temperature from said sixth temperature value to an ambient temperature value.

The present invention also relates to a method for preventing asbestos from freeing airborne particles comprising first soaking the asbestos with water, and then accomplishing the following sequential steps affecting the temperature surrounding the asbestos:

a) heating the asbestos in a first surrounding temperature value located between 125° F. (52° C.) and 175° F. (79° C.) and maintaining the asbestos in this first surrounding temperature value until the asbestos changes to a uniform pale russet-red color;

b) increasing the surrounding temperature from said first temperature value to a second temperature value located between 225° F. (107° C.) and 275° F. (135° C.) and maintaining the asbestos in this second surrounding temperature value until the asbestos changes to a uniform dark russet-red color;

c) increasing the surrounding temperature from said second temperature value to a third temperature value located between 325° F. (163° C.) and 375° F. (191° C.) and maintaining the asbestos in this third surrounding temperature value until the asbestos changes to a uniform dark orange color;

d) increasing the surrounding temperature from said third temperature value to a fourth temperature value located between 425° F. (218° C.) and 475° F. (246° C.) and maintaining the asbestos in this fourth surrounding temperature value until the asbestos changes to a uniform red color;

e) increasing the surrounding temperature from said fourth temperature value to a fifth temperature value located between 525° F. (274° C.) and 575° F. (302° C.) and maintaining the asbestos in this fifth surrounding temperature value until the asbestos changes to a uniform grey color;

f) increasing the surrounding temperature from said fifth temperature value to a sixth temperature value located between 625° F. (329° C.) and 675° F. (357° C.) and maintaining the asbestos in this sixth surrounding temperature value until the asbestos changes to a uniform opaque white color; and g) decreasing the surrounding temperature from said sixth temperature value to an ambient temperature value.

In one embodiment, the method further comprises the following step between step (f) and step (g):

ff) decreasing the surrounding temperature to a temperature value located between 225° F. (107° C.) and 325° F. (163° C.).

In one embodiment, wherein the following step is accomplished before step (a):

dividing the asbestos into pieces having a maximum dimension which is substantially equal to that of a conventional brick.

In one embodiment, the asbestos treated according to steps (a) to (g) is naturally admixed with other minerals and forms mineral pieces therewith, wherein the following step is accomplished before step (a):

z) dividing the mineral pieces into sub-pieces having a maximum dimension which is substantially equal to that of a conventional brick.

In one embodiment, step (z) comprises crushing the mineral pieces between a pair of axially parallel, spaced-apart rollers that rotate in opposite directions to obtain said sub-pieces.

In one embodiment, the asbestos is soaked by being submerged in water and is removed from the water before increasing the surrounding temperature according to steps (a) to (g).

According to one embodiment, in step (g), the surrounding temperature is decreased from said sixth temperature value to said ambient temperature value by transferring the asbestos to an area having said ambient temperature value.

DETAILED DESCRIPTION OF THE EMBODIMENTS

The present invention discloses a method for preventing asbestos from freeing airborne particles, to prevent the asbestos from having baneful effects for the human being. Indeed, if no asbestos airborne particles exist, then no asbestos particles become inhaled by humans, and it therefore becomes safe to use.

According to the present invention, asbestos that is retrieved from mine sites, either open mines or mine tunnels, must be soaked with water during its extraction. This can be accomplished in any suitable manner, for example with suitable water hoses that spray a high flow rate water jet during the asbestos extraction. According to one embodiment, the asbestos is soaked by being submerged in water during its extraction. In any event, ample quantities of water must be used to ensure a proper soaking of the asbestos that is or becomes in contact with the ambient air.

The asbestos extracted from a mine site will be retrieved in the form of mineral pieces of varying dimensions, these mineral pieces comprising asbestos and other minerals that are naturally admixed together. For example, the other mineral can be conventional rock.

After the asbestos-containing mineral pieces have been retrieved from the mine site, they are carried to a heat treatment location. During this carrying operation, the asbestos remains soaked at all times, for example by being submerged in water or by being regularly sprayed with water.

The water on the asbestos prevents the asbestos from freeing airborne particles into the air, as long as the asbestos remains soaked.

Figure 1A:
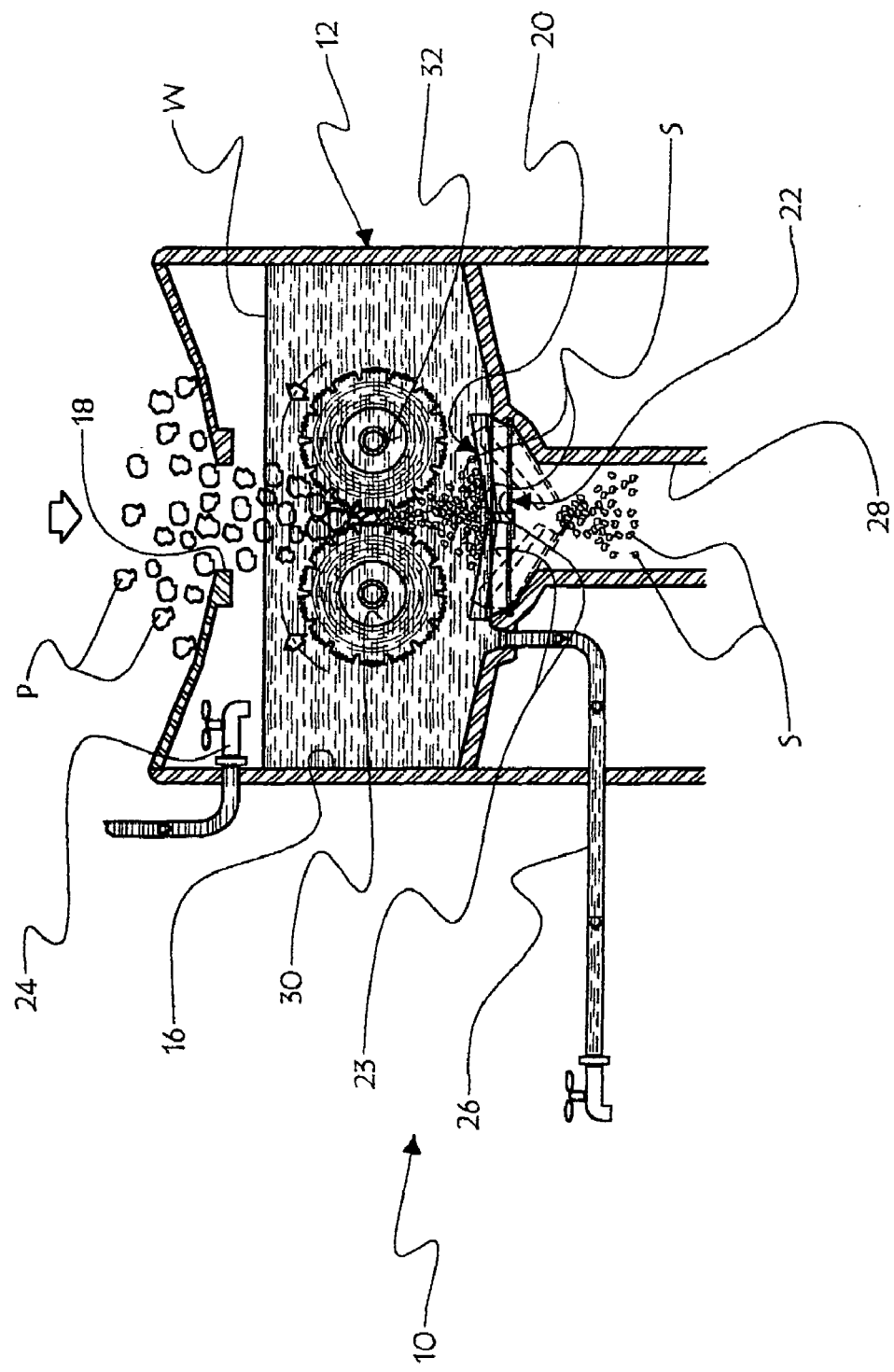
FIGS. 1A and 1B are two halves of a developed view of the crusher and kiln assembly used to accomplish the method of the present invention, and more particularly respectively showing the crusher and the underlying kiln of the crusher and kiln assembly.
Figure 1B:
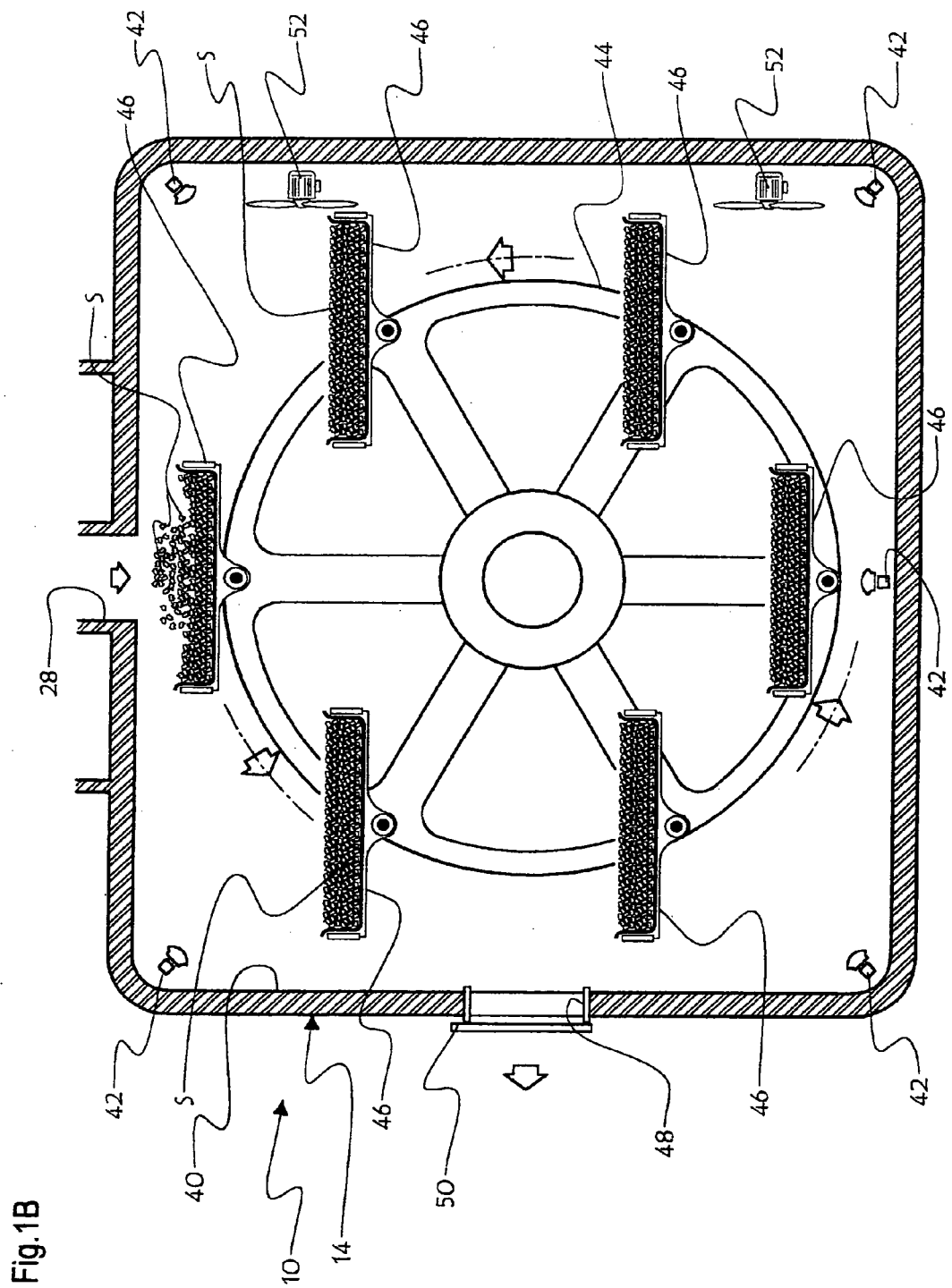

The heat treatment location can be a plant provided with a crusher and kiln assembly 10 as schematically shown in FIGS. 1A and 1B. Crusher and kiln assembly 10 comprises a crusher 12 (FIG. 1A) and an underlying kiln 14 (FIG. 1B) serially linked to each other.

FIG. 1A shows that the asbestos-containing mineral pieces P are poured into a crusher inner chamber 16 of crusher 12 through a top inlet port 18. Crusher inner chamber 16 also comprises a bottom outlet port 20 which may be selectively sealingly closed by fluid-tight, thermally insulated pivotable doors 22 that have upstanding flanges 23 on their upper surfaces to form a mineral container when they are closed. Crusher 12 further comprises a selectively controlled water inlet pipe 24 connected to a water source, and a selectively controlled drain pipe 26. A screen is provided at the upstream end of drain pipe 26 to prevent minerals from accidentally being drained therethrough when water is drained from crusher inner chamber 16. A pair of axially parallel, spaced-apart powered rollers 30, 32 that rotate in opposite directions are provided centrally under inlet port 18 in crusher inner chamber 16.

Crusher outlet port 20 provides access through an intermediate passage 28 to kiln 14, and more particularly to a kiln inner chamber 40 that is equipped with conventional heating means such as burners 42. Kiln 14 is also equipped with an inner rotatable wheel 44 that releasably carries a number of peripherally spaced troughs 46 that remain upwardly oriented at all times, so as not to spill their contents. A kiln outlet port 48 allows troughs 46 to be selectively retrieved from kiln 14. A door 50 selectively closes kiln outlet port 48. Powered fans 52 can be activated to accelerate the cooling procedure within kiln 14.

In use, mineral pieces P are poured through inlet port 18 inside crusher inner chamber 16 that is partly filled with water W. The spacing between rollers 30, 32 and the dimension of rollers 30, 32 are calibrated to ensure that all asbestos-containing mineral pieces P will pass between rollers 30, 32, so that at least all mineral pieces P having a dimension greater than a pre-determined maximum dimension will be crushed by rollers 30, 32 into asbestos-containing mineral sub-pieces S. The pre-determined maximum dimension for sub-pieces S is substantially equal to that of a conventional brick. Once a desired quantity of mineral sub-pieces S is obtained atop doors 22, for example as determined by a scale (not shown) intrinsic to doors 22, water W is drained through pipe 26 from inner chamber 16, and doors 22 are opened to allow sub-pieces S to pour into kiln 14 in an underlying trough 46. Doors 22 are thereafter closed again, and the above-described steps are repeated to fill all troughs 46 which are rotated to successively be filled as doors 22 open.

Once all troughs 46 are filled with asbestos-containing mineral sub-pieces S, the thermal treatment of the mineral can commence.

According to the present invention, the method for permanently preventing soaked asbestos from freeing airborne particles, comprises the following sequential steps affecting the temperature surrounding the asbestos:

a) heating the asbestos in a first surrounding temperature value located between 125° F. (52° C.) and 175° F. (79° C.) and maintaining the asbestos in this first surrounding temperature value until the asbestos changes to a uniform pale russet-red (or coppery) color;

b) increasing the surrounding temperature from said first temperature value to a second temperature value located between 225° F. (107° C.) and 275° F. (135° C.) and maintaining the asbestos in this second surrounding temperature value until the asbestos changes to a uniform dark russet-red (or coppery) color;

c) increasing the surrounding temperature from said second temperature value to a third temperature value located between 325° F. (163° C.) and 375° F. (191° C.) and maintaining the asbestos in this third surrounding temperature value until the asbestos changes to a uniform dark orange color;

d) increasing the surrounding temperature from said third temperature value to a fourth temperature value located between 425° F. (218° C.) and 475° F. (246° C.) and maintaining the asbestos in this fourth surrounding temperature value until the asbestos changes to a uniform red color;

e) increasing the surrounding temperature from said fourth temperature value to a fifth temperature value located between 525° F. (274° C.) and 575° F. (302° C.) and maintaining the asbestos in this fifth surrounding temperature value until the asbestos changes to a uniform grey color;

f) increasing the surrounding temperature from said fifth temperature value to a sixth temperature value located between 625° F. (329° C.) and 675° F. (357° C.) and maintaining the asbestos in this sixth surrounding temperature value until the asbestos changes to a uniform opaque white color; and g) decreasing the surrounding temperature from said sixth temperature value to an ambient temperature value.

The asbestos needs to be soaked before it is heated. Thus, the above-mentioned method additionally comprises the step of soaking the asbestos if non-soaked asbestos is to be treated.

It is understood that the surrounding temperature is the kiln inner chamber temperature according to the embodiment shown in the annexed drawings. However, other devices than kilns may alternately be used to provide the desired surrounding temperatures. Also, the ambient temperature value in step (g) may be obtained by transferring the asbestos from the kiln to an area having an ambient temperature value, such as by retrieving the asbestos from the kiln. It is noted that an ambient temperature is considered to be any temperature under 125° F. (52° C.), whereby the asbestos will not be affected by its surrounding temperature.

The kiln inner temperature may remain at a given temperature at each step (a) to (f) for about 18.5 minutes to 21.5 minutes.

According to one embodiment, the method further comprises the following step between step (f) and step (g):

ff) decreasing the surrounding temperature to a temperature value located between 225° F. (107° C.) and 325° F. (163° C.).

Step (ff) can optionally be accomplished more rapidly with fans 52.

In any event, either if the temperature surrounding the asbestos is gradually cooled while the asbestos is maintained in the kiln or if the asbestos is directly retrieved from the kiln upon it reaching its opaque white color, it is important to prevent the asbestos from remaining an excessively long time within the hot kiln after it has reached its desired opaque white color at step (f).

The asbestos will remain of an opaque white color after the heat treatment.

It is important to note that all the asbestos in the kiln must reach the determined color at each step of the above-mentioned method. If some asbestos pieces do not reach this color, then they might still free airborne particles afterwards. Thus, at least one camera (not shown) or at least one window such as a window on door 50 is provided to allow a person to visually verify the color evolution of the asbestos within kiln 14.

It is understood that all other minerals within kiln 14 will also be heated simultaneously. The asbestos may be retrieved from the other minerals once it has cooled according to conventional methods. Thus, the present method may be used to treat pure asbestos or asbestos contained in or admixed with other mineral formations.

The asbestos treated according to the above-mentioned thermal treatment method will not free airborne particles. Indeed, the thermal treatment method of the invention will affect the polarity of the fibers which will develop a magnetism, the fibers thereafter attracting one another. Thus, the asbestos fibers become non-frangible due to their inherent magnetic attraction. Moreover, the asbestos fibers, with their new, modified polarity, will have an increased inter-attraction towards the earth itself, and asbestos particles will consequently have a tendency to fall directly to the ground if they are freed from a mineral piece, instead of becoming airborne. Thus, not only are the asbestos fibers less likely to be freed from a mineral piece, but also it is likely that they will not be inhaled even if they are freed from a mineral piece, since they will fall to the ground instead of remaining airborne. Also, the heat treatment method does not damage the asbestos fibers and their envelopes, and the asbestos fibers will consequently keep their flexibility, their resistance, their endurance and their other physical characteristics that make asbestos fibers useful.

We claim:

1. Method for preventing soaked asbestos from freeing airborne particles, comprising the following sequential steps affecting the temperature surrounding the asbestos:

a) heating the asbestos in a first surrounding temperature value located between 125° F. (52° C.) and 175° F. (79° C.) and maintaining the asbestos in this first surrounding temperature value until the asbestos changes to a uniform pale russet-red color;

b) increasing the surrounding temperature from said first temperature value to a second temperature value located between 225° F. (107° C.) and 275° F. (135° C.) and maintaining the asbestos in this second surrounding temperature value until the asbestos changes to a uniform dark russet-red color;

c) increasing the surrounding temperature from said second temperature value to a third temperature value located between 325° F. (163° C.) and 375° F. (191° C.) and maintaining the asbestos in this third surrounding temperature value until the asbestos changes to a uniform dark orange color;

d) increasing the surrounding temperature from said third temperature value to a fourth temperature value located between 425° F. (218° C.) and 475° F. (246° C.) and maintaining the asbestos in this fourth surrounding temperature value until the asbestos changes to a uniform red color;

e) increasing the surrounding temperature from said fourth temperature value to a fifth temperature value located between 525° F. (274° C.) and 575° F. (302° C.) and maintaining the asbestos in this fifth surrounding temperature value until the asbestos changes to a uniform grey color;

f) increasing the surrounding temperature from said fifth temperature value to a sixth temperature value located between 625° F. (329° C.) and 675° F. (357° C.) and maintaining the asbestos in this sixth surrounding temperature value until the asbestos changes to a uniform opaque white color; and g) decreasing the surrounding temperature from said sixth temperature value to an ambient temperature value.

2. Method for preventing asbestos from freeing airborne particles comprising first soaking the asbestos with water, and then accomplishing the following sequential steps affecting the temperature surrounding the asbestos:

a) heating the asbestos in a first surrounding temperature value located between 125° F. (52° C.) and 175° F. (79° C.) and maintaining the asbestos in this first surrounding temperature value until the asbestos changes to a uniform pale russet-red color;

b) increasing the surrounding temperature from said first temperature value to a second temperature value located between 225° F. (107° C.) and 275° F. (135° C.) and maintaining the asbestos in this second surrounding temperature value until the asbestos changes to a uniform dark russet-red color;

c) increasing the surrounding temperature from said second temperature value to a third temperature value located between 325° F. (163° C.) and 375° F. (191° C.) and maintaining the asbestos in this third surrounding temperature value until the asbestos changes to a uniform dark orange color;

d) increasing the surrounding temperature from said third temperature value to a fourth temperature value located between 425° F. (218° C.) and 475° F. (246° C.) and maintaining the asbestos in this fourth surrounding temperature value until the asbestos changes to a uniform red color;

e) increasing the surrounding temperature from said fourth temperature value to a fifth temperature value located between 525° F. (274° C.) and 575° F. (302° C.) and maintaining the asbestos in this fifth surrounding temperature value until the asbestos changes to a uniform grey color;

f) increasing the surrounding temperature from said fifth temperature value to a sixth temperature value located between 625° F. (329° C.) and 675° F. (357° C.) and maintaining the asbestos in this sixth surrounding temperature value until the asbestos changes to a uniform opaque white color; and g) decreasing the surrounding temperature from said sixth temperature value to an ambient temperature value.

3. The method according to claim 2, further comprising the following step between step (f) and step (g):

ff) decreasing the surrounding temperature to a temperature value located between 225° F. (107° C.) and 325° F. (163° C.).

4. The method according to claim 2, wherein the following step is accomplished before step (a):

dividing the asbestos into pieces having a maximum dimension which is substantially equal to that of a conventional brick.

5. The method according to claim 2, with the asbestos treated according to steps (a) to (g) being naturally admixed with other minerals and forming mineral pieces therewith, wherein the following step is accomplished before step (a):

z) dividing the mineral pieces into sub-pieces having a maximum dimension which is substantially equal to that of a conventional brick.

6. The method according to claim 5, wherein step (z) comprises crushing the mineral pieces between a pair of axially parallel, spaced-apart rollers that rotate in opposite directions to obtain said sub-pieces.

7. The method according to claim 2, wherein the asbestos is soaked by being submerged in water and is removed from the water before increasing the surrounding temperature according to steps (a) to (g).

8. The method according to claim 1, wherein in step (g), the surrounding temperature is decreased from said sixth temperature value to said ambient temperature value by transferring the asbestos to an area having said ambient temperature value.

* * * * *